United States Patent [19]

Evans

[11] 3,818,648

[45] June 25, 1974

[54] QUICK-CHANGE WHEEL GUARD FOR TOOL AND CUTTER GRINDER

[75] Inventor: Wendell Irving Evans, Cincinnati, Ohio

[73] Assignee: Cincinnati Milacron Inc., Cincinnati, Ohio

[22] Filed: Jan. 10, 1973

[21] Appl. No.: 322,278

[52] U.S. Cl. ................................................ 51/268
[51] Int. Cl. .......................................... B24b 55/04
[58] Field of Search ............ 51/268, 269, 670, 672, 51/274, 277; 144/252 R, 252 A, 251 R, 251 A, 251 B

[56] References Cited
UNITED STATES PATENTS

| | | | |
|---|---|---|---|
| 2,707,854 | 5/1955 | Johnson | 51/268 |
| 2,894,418 | 7/1959 | Jackson | 51/268 X |
| 3,157,009 | 11/1964 | Barkley | 51/273 |
| 3,571,983 | 3/1971 | Stewart | 51/269 |

FOREIGN PATENTS OR APPLICATIONS 249,671  4/1926  Great Britain ....................... 51/268

*Primary Examiner*—Othell M. Simpson

[57] ABSTRACT

A quick-change guard for machine tools supporting a rotating tool, the guard having a backplate located perpendicular to the axis of and to the rear of the rotating tool, the backplate being cup-shaped with the cupped portion partially enveloping the cutting tool. The cupped portion is further suited to receive an energy absorbing liner interposed between the cutting tool and the inner surface of the cupped portion for substantially dissipating the energy of broken tool fragments in the event of wheel fracture. The quick-change guard further includes a ring releasably secured to the outer surface of said cupped portion, the ring encircling the tool and containing a shield extending therefrom to enclose a substantial portion of the rotating tool.

7 Claims, 6 Drawing Figures

PATENTED JUN 25 1974 3,818,648
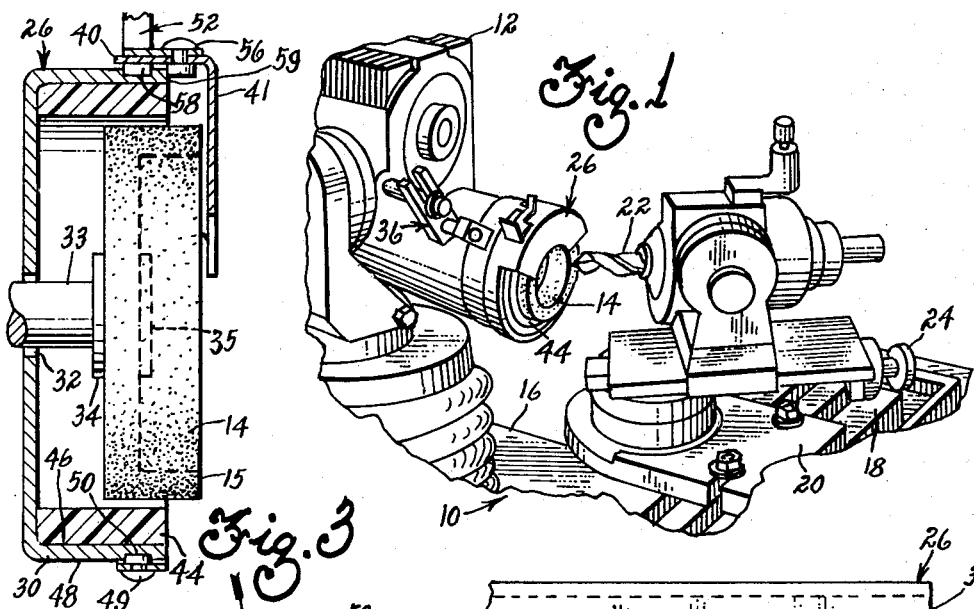
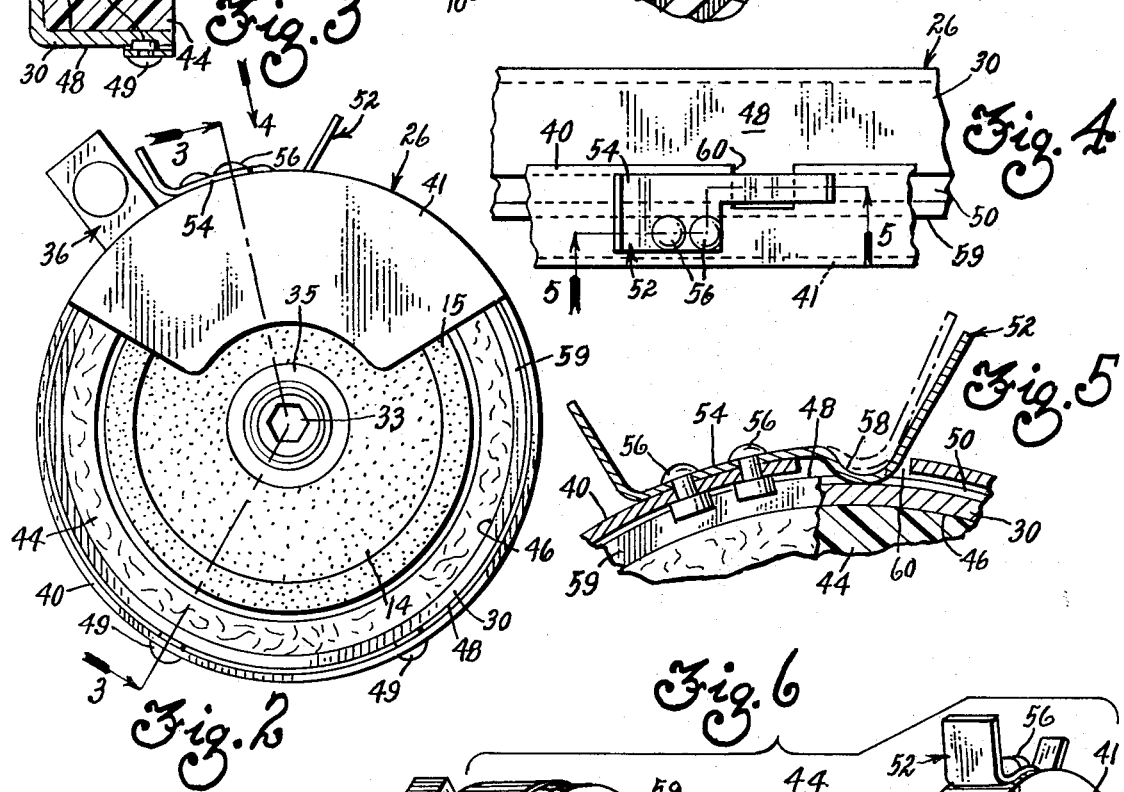

QUICK-CHANGE WHEEL GUARD FOR TOOL AND CUTTER GRINDER

BACKGROUND OF THE INVENTION

This invention relates to a cutting tool guard for machine tools and more particularly to a wheel guard for a tool and cutter grinder.

In tool and cutter grinding operations, the grinding wheel is changed periodically to make possible the performance of a variety of grinding operations. Various guard structures have been designed which are suited for the plurality of wheels and grinding operations employed on a tool and cutter grinder. In the past, changing these guards required not only removal of the old guards, but also a realignment of the new guard before securing it to the wheelhead. Thus, whenever a wheel was to be changed, or a new operation to be performed requiring a new guard, the old guard had to be removed and the new guard relocated and placed on the wheelhead of the grinder. This operation was a time consuming factor in the production process.

Various improvements have been made in the guards for tool and cutter grinders resulting in guards which can be quickly changed and which require minimum relocation of the guard in relationship to the wheel. One such improvement is disclosed in the co-pending application of Clyde R. Eby, entitled "Quick-change Wheel Guard for Tool and Cutter Grinder," Ser. No. 303,005, filed Nov. 2, 1972 and assigned to the present assignee.

Applicant herein discloses a new type of grinder guard which can be quickly changed and requires no relocation of the guard in relationship to the wheel. Thus, the present invention provides a quickly changeable and easily replaceable wheel guard for use with tool and cutter grinders.

SUMMARY OF THE INVENTION

The invention provides a backplate which is permanently secured to the wheelhead and designed so that the wheel may be mounted in front of the plate. The backplate is cup-shaped with the cupped portion partially enveloping the grinding wheel to form a primary guard. The cupped portion of the backplate is suited to receive an energy absorbing liner interposed between the grinding wheel and the inner surface of the cupped portion for substantially dissipating the energy of broken wheel fragments. The liner may be of the type disclosed in the co-pending application of Charles B. Matson, entitled, "Wheel Guard for Tool and Cutter Grinder," filed Oct. 19, 1972, Ser. No. 298,941, and assigned to the present assignee. A groove is placed around the outer surface of the cupped portion. A ring containing a secondary guard or shield for shielding portions of the grinding wheel is then releasably secured to the cupped portion through a series of studs designed to fit within the groove and a release spring for holding the ring in place. When it becomes necessary to change either the wheel or the secondary wheel guard, the release spring is simply compressed and the guard removed. The new secondary guard may then be located on the groove and secured to the cupped portion to shield the operator from fragments in the event of wheel fracture during grinding.

In summary, the invention provides a quick-change wheel guard for use with the tool and cutter grinder or similar machines requiring a number of guard structures for various machine operation.

BRIEF DESCRIPTION OF THE DRAWINGS

FIG. 1 is a perspective view of the tool and cutter grinder including the preferred embodiment of the present invention.

FIG. 2 is a front view of the grinding wheel and the guard assembly.

FIG. 3 is a section view taken along lines 3—3 of FIG. 2.

FIG. 4 is a fragment view taken in the direction of arrow 4 in FIG. 2.

FIG. 5 is a section view taken along lines 5—5 of FIG. 4, enlarged for clarity.

FIG. 6 is an exploded view showing the relationship of the various components of the guard system.

DETAILED DESCRIPTION

In FIG. 1 there is shown a tool and cutter grinder 10 having a wheelhead 12 containing a rotatable spindle 33 (see FIG. 2) for securing and driving a grinding wheel 14. The wheelhead 12 is secured to a base structure 16 and is generally indexible in two planes. Also secured to the base structure 16 is a table 18 for securing and locating a workholder 20, which is designed to rotatably secure the tool or other workpiece 22 to be ground. The workholder 20 is generally indexible in two planes and means 24 are provided to move the work with respect to the grinding wheel 14. The guard structure 26 is secured and located on the wheelhead 12 so that it substantially surrounds the entire grinding wheel 14.

The cup-shaped backplate 30 of the guard structure 26 is placed in a plane perpendicular to the axis of the spindle 33, and has a central aperture 32 through which the spindle 33 may pass, see FIGS. 3 and 6. The cupped portion forms a primary guard system substantially surrounding the periphery of the wheel. The wheel 14 is sandwiched between wheel flanges 34 and 35 and secured to the spindle 33. The backplate 30 of the guard structure 26 is secured in any suitable manner to the wheelhead 12, for example the securing means 36 shown in FIG. 1. The backplate 30 may be permanently secured to the wheelhead 12 and provides permanent alignment of the primary guard and the secondary guard or the shield 40 with respect to the grinding wheel 14.

The guard structure 26 of the present invention is primarily utilized in conjunction with cup-shaped wheels wherein the face 15 of the wheel is the abrasive grinding surface. The shield 40 is designed in such a manner that a portion of the face 15 is exposed to permit clearance during grinding operations while a plate 41 on the front of the shield 40 and perpendicular to the spindle 33 encloses a portion of the grinding wheel 14.

The outer surface 48 of the cupped portion 30 contains a peripheral groove or channel 50. As shown in FIG. 3, the shield 40 is designed to fit over the cupped portion and studs 49 are received by the channel 50. By placing the studs in one quadrant of the arc forming the shield and placing a spring 52 in the center of the opposite quadrant, the shield 40 may be secured to the backplate 30 by releasing the spring 52 into the channel 50 after the studs 49 have been seated therein. In this manner, the shield 40 is placed about the wheel 14.

As illustrated in FIGS. 4 and 5, the spring release is utilized to facilitate in the easy removal and replacement of the shield 40 to the backplate 30. The spring 52 is designed to fit in the channel 50 and is of sufficient tension to render the shield 40 substantially immobile once the spring 52 is released, see particularly FIG. 5. The spring 52 includes a base 54 through which the spring is permanently secured to the shield 40, for example, by rivets 56. When the spring 52 is compressed as shown in phantom in FIG. 5, the loop 58 of the spring is withdrawn from the channel 50 and the shield 40 may be removed from the backplate 30. The studs 49, which fit snuggly in the groove 50 may be lifted out of the channel once the spring 52 is compressed. In this manner, the shield 40 is easily replaceable when a new grinding operation is undertaken or the wheel 14 has to be replaced.

As can be seen, when the spring 52 is released, the loop slips through clearance 60 into channel 50. To further aid in aligning the shield 40 with the backplate 30, the rivets 56 provide positive stops locating the shield with respect to the edge 59 of the backplate 30, see FIG. 3. In this manner, the shield 40 may be quickly seated in proper position.

As shown in FIG. 2, and FIG. 6, an energy absorbing liner 44 may be interposed between the grinding wheel and the inner surface 46 of the cupped portion for substantially dissipating the energy of the broken wheel fragments in the event of fracture. The liner 44 may be of any deformable medium, an example of which is disclosed in the co-pending application of Charles B. Matson entitled, "Wheel Guard for Tool and Cutter Grinder," filed Oct. 19, 1972, Ser. No. 298,941 and assigned to the present assignee.

An exploded view showing the relationship of the various components of the guard system is shown in FIG. 6. The deformable liner 44 is placed inside the cupped backplate 30 and against the inner surface 46. The liner 44 is interposed between the surface 46 and the grinding wheel 14, to dissipate the energy of broken tool fragments in the event of fracture. As shown in FIG. 3, the wheel 14 extends partially beyond the backplate 30 and secondary shielding is desirable. By providing the channel 50 on the backplate 30, the shield 40 may be placed thereon by placing studs 49 in the groove while the spring 52 is compressed. Once the shield 40 is properly placed around the backplate 30, spring 52 may be released into the channel 50 thus releasably securing the shield 40 to the backplate 30. The face 41 of the shield 40 may be of any desirable shape providing only enough exposure of the grinding wheel 14 to perform the particular operation desired. Thus, by providing a number of shields 40 with various face plates 41 as an integral part thereof, different shielding techniques may be utilized for the various grinding operations performed.

While particular embodiments have been shown and described, it should be understood that the foregoing is for illustrative purposes and is not intended to limit the scope and spirit of the appended claims.

What is claimed is:

1. A quick-change guard for a tool and cutter grinder having a rotating grinding wheel, said guard comprising:

a. a cup-shaped backplate forming a primary shield, the base of which is located perpendicular to the axis of and to the rear of the rotating wheel, said backplate fixedly secured to the tool and cutter grinder;

b a secondary shield;

c a plurality of studs secured to the secondary shield and placed in one quadrant of the periphery of the secondary shield;

d a channel around the periphery of said backplate suited to receive said studs;

e a spring designed to fit within said channel and secured to the secondary shield in a quadrant opposite said stud quadrant whereby release of the spring secures said secondary shield to said backplate; and f a face plate extending from said secondary shield and enclosing a predetermined portion of said wheel.

2. The apparatus of claim 1 wherein there is further comprised a positive stop secured to said secondary shield for facilitating placement of the secondary shield with respect to the backplate.

3. The apparatus of claim 1 wherein there is further comprised a deformable liner placed within the cup-shaped backplate and interposed between said backplate and the grinding wheel.

4. A quick change guard comprised in part of a cup shaped primary shield attached to a machine tool and a cylindrical secondary shield, said secondary shield having a faceplate to enclose a predetermined portion of rotating tool, wherein the improvement comprises:

a a plurality of studs attached to an interior surface of the secondary shield and located along a circumferential line in a first quadrant of the secondary shield;

b an annular channel located on an exterior surface of the primary shield for receiving said studs; and c means for releasably securing said secondary shield to said primary shield.

5. The apparatus of claim 4 wherein the means for releasably securing comprises:

a a slot in the secondary shield located along the circumferential line opposite the first quadrant; and b a leaf spring having one end configured to form a loop and being attached to the secondary shield at a location permitting the loop to pass through the slot and to engage the channel in the primary shield, whereby said spring secures said secondary shield to said primary shield and flexing of the spring to remove the loop from the channel releases the secondary shield from the primary shield.

6. The apparatus of claim 5 wherein the improvement further comprises a second plurality of studs attached to the inside surface of the secondary shield along a second circumferential line to facilitate locating the secondary shield with respect to the primary shield.

7. The apparatus of claim 6 wherein the improvement further comprises a deformable liner placed circumferentially along an interior surface of the primary shield whereby said liner is interposed between said primary shield and the rotating tool.

* * * * *